S. C. HATFIELD.
ELASTIC WHEEL.
APPLICATION FILED MAY 1, 1913.
1,105,654.
Patented Aug. 4, 1914.
2 SHEETS—SHEET 1.
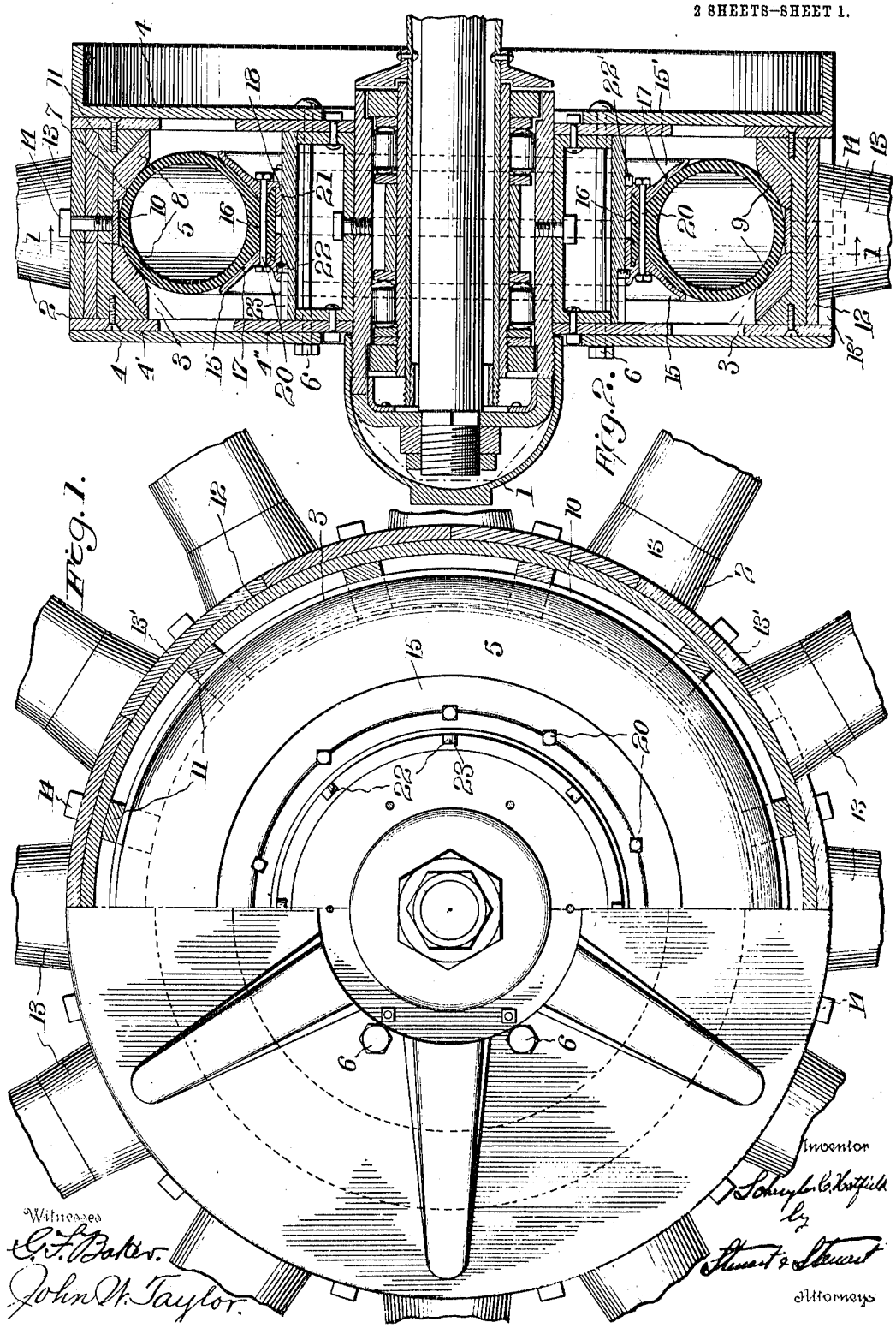

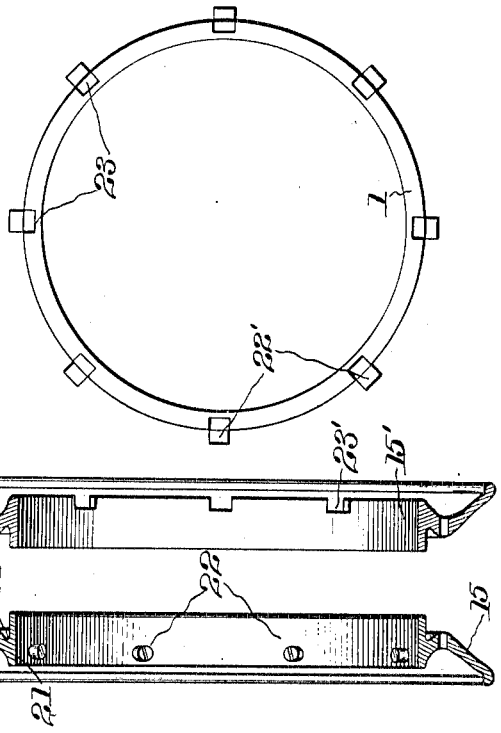
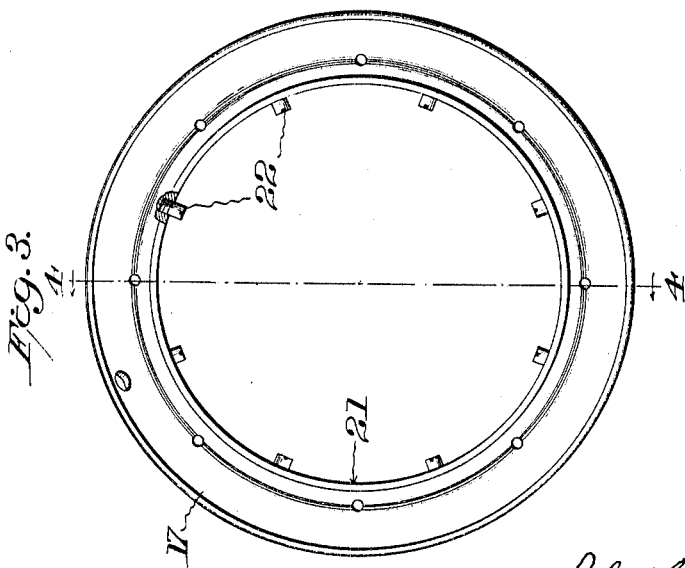

UNITED STATES PATENT OFFICE.

SCHUYLER C. HATFIELD, OF BALTIMORE, MARYLAND.

ELASTIC WHEEL.

1,105,654.   Specification of Letters Patent.   Patented Aug. 4, 1914.

Application filed May 1, 1913. Serial No. 764,831.

*To all whom it may concern:*

Be it known that I, SCHUYLER C. HATFIELD, a citizen of the United States of America, residing at the city of Baltimore, State of Maryland, have invented certain new and useful Improvements in Elastic Wheels, of which the following is a specification.

This invention relates to various vehicle wheels and particularly to an elastic wheel in which resilient means is interposed between the hub and spokes.

The wheels of the general type to which the invention relates differ from the ordinary rigidly constructed wheel in that the hub is mounted in a central circular aperture in the wheel and supported therein by means of an annular resilient member shown in the form of an annular pneumatic pad or tire which encircles the hub and engages the wall of the aperture in the wheel with its outer periphery. The hub is thus free to move relatively to the wheel proper in the direction of the radii thereof, but all tendency to lateral movement is positively restrained, and its movements in the direction of the radii are cushioned by means of the resilient member referred to as a tire or pad. While means is provided for positively resisting the lateral stresses, the torsional stress or torque of the road must be transmitted from the wheel proper to the hub by way of the pad, and it will be apparent that a considerable tendency to slipping and consequent abrasion of the pad may result. This tendency exists both between the tire and the wheel, and between the tire and the hub, but actual slipping is most apt to occur in the latter instance, first, because the moment arm at this point is short and the stress which tends to produce slipping consequently great, and second because inflation of the tire to operative condition stretches it, increases its inside diameter, and reduces the friction exerted by the tire on the hub. Such slipping and friction when they exist are objectional not only on account of the wear on the pad or tire, but because of the fact that with any appreciable degree of slipping at this point, a considerable proportion of the driving force would be lost, and if the slip became excessive, propulsion of the vehicle through the drive shaft and hubs would be rendered wholly impossible.

To overcome the difficulty thus encountered and fasten the pad to the hub so that the chance of slip or rotation at this point is wholly eliminated, is the object of my invention. To this end I have provided the pad or tire with a rib encircling its inner periphery, and to coöperate with this rib I have provided annular seating bands which are keyed to the hub, and which not only form a grooved seat for the pad or tire, but are also adapted to inclose the rib and prevent undue distortion of this member. The bands are preferably perforated to receive fastening means which pass through the bands and through the rib which is correspondingly perforated. Thus the pad is positively secured to the hub and rotation relatively thereto is prevented. While inflation of the tire increases its diameter and prevents it from adhering with sufficient tenacity to the hub, the same increase of diameter forces the outer periphery of the tire against the encircling walls of the aperture in the wheel so that with a suitable seating surface at this point, slipping of the pad relatively to the wheel and consequent friction are so slight as to be negligible in practice.

In the accompanying drawings I have illustrated fragmentarily an elastic vehicle wheel to which my invention in its preferred form has been applied.

In the drawings Figure 1 is a view of the central portion of a motor vehicle wheel, the view being divided on a vertical line passing through the center so that one half is a side elevation and the other half on the right of the view is a section taken on the line 1, 1 of Fig. 2. Fig. 2 is a vertical central section of the hub and central portion of the wheel taken on the line of the axis. Fig. 3 is a side elevaton of one plate ring. Fig. 4 is a vertical, central section of the same. Fig. 5 is a detail of the hub.

Referring to the drawings by numerals, each of which is applied to the same or similar parts of the different figures, the wheel, as shown, consists of two separate parts, referred to herein as the hub 1 and the wheel proper 2, the hub being mounted within a central circular aperture 3 in the wheel proper inclosed by a ring 12 to which sockets 13 for the inner ends of the spokes are secured. The hub and wheel are so formed that while the hub is permitted to move in the direction of the spokes or the radii of the wheel, all tendency to lateral movement is restrained as by means of suitable cover plates 4 bearing on flat circular surfaces 4' and 4" on the wheel and hub, respectively, and held by bolts 6 parallel to the axis of the wheel. The radial motion of the hub is controlled by means of a resilient member 5 in the form of an annular pad or tire encircling the hub and bearing at its periphery against the inner walls of the aperture 3, or more properly resting in the annular seat 7 within the ring 12. This seat, as shown, is built up of two similar rings 8 curved on their inner periphery at 9 to fit the contour of the tire and a central flat ring 10. These rings or seating members 8 and 10, as shown, are supported on blocks 11 which are spaced along the walls of the aperture 3 and secured to the ring 12 by any suitable means as bolts 14 which hold the socket members 13 and the curved locking plates 13' therefor, the sockets being shown as tapered and fitting in tapered openings between the plates.

The important feature of the invention resides in the means for securing the annular pad or tire 5 to the hub. This consists of two annular seating bands 15 and 15' which are curved to fit the tire and an internal rib 16 on the tire. The bands are so placed that their curved portions 17 are oppositely disposed, and so related that they form a seat for the curved surfaces of the tire or pad 5. In addition to the curved portion 17, each of the bands 15 and 15' has a V-shaped extension 18, the mouth of the V being inwardly disposed, and one arm of the V being in the form of a flat flange or band 21 encircling the hub. The V-shaped members inclose the rib 16 on the tire and the bands are held together by means of bolts 20 parallel to the axis of the wheel and passing through the rib 16 and each band 15 and 15'. The band 15 is provided on its flat internal surface 21 with studs 22 which may be screw-threaded and slotted as shown. These fit in slots 23 in the hub provided for that purpose and disposed in a direction parallel to the axis of the wheel. The slots extend inward from the end of the hub on the side adjacent which the ring 15 is placed. The ring 15' is held by means of studs 22' which project radially from the hub and engage notches 23' in the edge of the ring 15'. The other features of the hub, as the bearings, etc., are fully illustrated in their operative relation and will be easily understood by those skilled in the art, but in this connection it will be clearly apparent that the details of the wheel and of the hub, exclusive of the features which I have described, are not important and may be designed to suit the traffic.

By means of the device described, the pad or tire is rigidly secured to the hub so that rotation of the hub relatively to the tire or pad is prevented. Thus the tire may be inflated to any pressure found desirable without incurring the slightest possibility of freeing it from the hub whereby the members of the wheel will be permitted to rotate relatively to each other. By thus reducing or in fact eliminating the slip between the pad and the hub and wheel member, the wear between the pad and the rigid members of the wheel is greatly reduced and the life of the tire is correspondingly increased. In addition to this the seating bands 15 form a convenient socket or seat for the tire whereby the tendency to cut the tire is reduced.

I have thus described specifically a single embodiment of my invention in order that its nature and operation may be clearly understood. However, the specific terms herein are used descriptively rather than in their limiting sense and the scope of the invention is defined in the claims.

I claim—

1. In an elastic wheel, a hub movable radially relatively to the wheel proper, a pneumatic pad encircling the hub, a rib on the pad projecting from its inner periphery, the rib being of considerable width in a direction parallel to the axis of the wheel and tapering toward the center of the pad, seating bands encircling the hub, one of the bands being keyed to the hub, the bands having curved portions to form a seat for the tire, each band having a V-shaped member adapted to inclose part of the rib on the tire and means in the form of bolts passing through each said member for securing the bands one to the other and forcing the bands together, clamping the rib between the bands.

2. In an elastic wheel, a wheel member having a central aperture, a hub mounted therein to move radially relatively to the wheel member, an annular pad encircling the hub and engaging with its periphery the inner wall of the aperture in the wheel, the pad having an inwardly projecting rib, two seating bands each having an inwardly disposed curved portion forming a seat for the tire and a V-shaped portion adapted to inclose part of the rib on the tire, the hub and the bands being connected to prevent relative rotation and means for securing the bands to each other and forcing the bands together and clamping the rib between the bands.

3. In an elastic wheel consisting of a wheel member and a hub mounted to move radially in all directions relative to the wheel, an annular pneumatic pad between the hub and the wheel member, means for supporting the pad and securing it to the hub consisting of two annular seating bands curved to fit the pad, an internal rib on the pad, the bands being so placed that their curved portions are oppositely disposed and so related that they form a seat for the curved inner surface of the pad, each of the bands also being provided with a V-shaped extension, the mouth of each V being inwardly disposed and one arm of the V being in the form of a flat flange or band encircling the hub, the V-shaped members serving to inclose the rib on the pad and a bolt parallel to the axle of the wheel and passing through the rib and through each band, and a nut on the bolt by which the members traversed thereby are forced together.

4. In an elastic wheel consisting of a wheel member and a hub movable radially in all directions relatively to the wheel, an annular pneumatic pad between the hub and the wheel member, means for securing the pad to the hub consisting of two annular seating bands curved to fit the pad and an internal rib on the pad, each of the bands being provided, in addition to the curved portion, with a V-shaped extension, one arm of the V forming a flat flange or band encircling the hub, the mouth of each V being turned inward, the V-shaped members serving to inclose the rib on the pad, bolts passing through the bands and the rib and means coöperating with each of the flat bands for preventing rotation of the pad relatively to the hub.

Signed by me at Baltimore, Maryland, this 30th day of April, 1913.

SCHUYLER C. HATFIELD.

Witnesses:
ZELLA KUHN,
JOHN E. CROSS.